Robert G. Russell
INVENTOR

Robert G. Russell
INVENTOR

ROBERT G. RUSSELL
INVENTOR

Oct. 13, 1959 R. G. RUSSELL 2,908,036
APPARATUS FOR PRODUCTION OF GLASS FIBERS
Filed Nov. 22, 1954 5 Sheets-Sheet 4

ROBERT G. RUSSELL
INVENTOR

BY *Staehli & Overman*
ATTORNEYS

Oct. 13, 1959          R. G. RUSSELL          2,908,036
APPARATUS FOR PRODUCTION OF GLASS FIBERS
Filed Nov. 22, 1954          5 Sheets-Sheet 5

INVENTOR.
ROBERT G. RUSSELL
BY
ATTORNEYS

United States Patent Office 2,908,036
Patented Oct. 13, 1959

---

2,908,036

APPARATUS FOR PRODUCTION OF GLASS FIBERS

Robert G. Russell, Granville, Ohio, assignor to Owens Corning Fiberglas Corporation, a corporation of Delaware Application November 22, 1954, Serial No. 470,357

8 Claims. (Cl. 18—8)

This invention relates to improvements in the production of fibers from heat-softenable materials and particularly to a more stable continuous method and apparatus for producing fibers of siliceous material such as glass or the like which simultaneously effects an increase in quality, economy and ease of handling such fibers.

The invention is described particularly in connection with the production of continuous glass fibers wherein streams of molten glass are attenuated mechanically into continuous fibers of small diameter which are then gathered into a strand and wound into a package. Fibers thus produced are then usually processed into other textile forms such as yarns, cords, roving, etc. on conventional textile machinery for subsequent use in ever-widening fields of application.

In greater detail, the process of producing continuous fibers of glass to which the present invention relates involves flowing streams of molten glass from orifices of an electrically heated bushing or feeder associated with a container reservoir in which the material is reduced to a molten condition. The orifices are preferably formed in projecting tips or nipples from which heat of the glass is dissipated as it flows in the form of streams therefrom, but may also be formed in the apex of a V-shaped feeder or other structural arrangements such as a flat plate feeder made of a non-wetting alloy. Upon emission to the atmosphere, the streams of glass, each neck down, as determined by their viscosity and surface tension, to form a cone-like body of the glass from the tip of which a fiber is drawn. Tests indicate that the cohesive forces which transmit the attenuation forces from the fiber to the body of the cone are closely related to the viscosity of the glass. Surface tension of the glass also contributes to the transfer of forces over the periphery of the cone, but, in addition, acts to bring about constriction of the stream into the conical configuration. Low viscosity fluids, such as glass at too high a temperature may actually be constricted into beads by the surface tension, or in other words, divided into a series of droplets instead of flowing as a continuous stream. High viscosity of fluid, on the other hand, slows the constricting forces and does so with much more pronounced effect as the diameter is diminished, thereby causing viscosity to act as a major factor determining stability in the fiber-forming zone.

Thus, it can be seen that if the viscosity of a given glass emitted from an orifice into a forming cone is too high, the tension required to be applied to the cooled fiber to effect attenuation of the cone can be so high as to result in breakage of the fiber. At the more fluid end of the viscosity range, however, emission of highly fluid glass results in a form of pumping within the cone which results in a dancing movement or instability of the cones at the feeder tips. Furthermore, if the viscosity of the glass is extremely low, surface tension acts undesirably to constrict the glass into discontinuous separate droplets. A range of viscosities therefore exists within which fiberization can be accomplished and above which and below which fibers are difficult or impossible to produce.

According to the present invention, we have made it possible to extend the viscosity range to permit fiberization of glass heated to a much higher temperature and to a much more fluid condition than has heretofore been believed possible to fiberize. This permits production of fibers of greater homogeneity and fiberization of glasses heretofore non-fiberizable while at the same time making operating conditions less critical to temperature variations as explained hereafter. It has been found, however, that in attenuating fibers from molten glass heretofore, the ranges of temperature and viscosity of the main body of glass were generally limited by the rate at which the glass in the cones could be cooled to the fiberization viscosity range. The rate of cooling was more or less uncertain in that it was subject to random conditions of the atmosphere surrounding the feeder tips. This frequently resulted in erratic operation of the forming apparatus and production of fibers of less uniformity than requirements dictated.

In addition, on exposure to the atmosphere, the glass which flows from the main body of glass moves in the cones relatively slowly, but after being necked down to form fibers, the linear movement is extremely rapid and at times reaches velocities in the order of 15,000 to 20,000 feet per minute or more. With such high velocities, drafts of air are caused to move with the fiber surfaces and to create air eddies about the cones which result in highly erratic temperature conditions and consequent unpredictability both in cone stability and continuity of operation.

We have found according to the present invention, however, that the fiber-forming cones emitted from the feeder orifices can be shielded against eddies and cooled under controlled conditions to overcome such results.

It is an object of the present invention to provide an improved method and means for forming continuous glass fibers in a more trouble-free continuous operation than has heretofore been possible. We have discovered that instability of the cones can be overcome by providing cool shield members immediately adjacent the fiber-forming cones. Such shields act to more rapidly cool the glass emitted from the orifices and baffle, or, in a sense, isolate movement of air eddies about the feeder tips and cones. In another sense, the shield members offer an environmental-type control for the glass cones which results in cone stabilization and formation of fibers of much greater uniformity.

It is another object of the invention to provide an improved method and means for forming continuous glass fibers in which the resulting fibers are of a much higher quality in that they are much more uniform in fiber diameter and yardage per pound as well as in internal structural constitution. An important factor influencing and promoting such uniformity in the fibers by the present invention is the higher fluidity with which the glass may be supplied from the feeder without fear of imparting disrupting instability to the cones.

It is still another object of the present invention to provide a new method and means for producing glass fibers of greater strength than fibers produced heretofore. The use of a higher glass temperature, and consequently a more fluid glass in the forming cones, imparts a smoother or more perfect surface to the fibers which has been found to result in greater tensile strength. Strength is further promoted by the fact that the glass can be maintained well above its liquidus temperature reducing the possibility of devitrification or fixing of undesired crystal phases of the glass during formation of the fiber. When glass is heated to higher temperatures according to the present invention, tendencies toward devitrification and passage through the feeder orifices of seeds, bubble, viscous streaks, or cords which may arise are thus substantially eliminated, thereby additionally assuring a more constant continuous forming operation and greater strength in the finished fibers due to greater uniformity of the glass structure.

It is a further object of the present invention to provide an improved method and means for forming continuous glass fibers in a more trouble-free continuous operation than has heretofore been possible. With the higher temperature glass permissible within the concepts of the invention, it is possible to reduce the tension in the individual fibers and reduce the number of breaks in such fibers both at the feeder tips and at the point of gathering the fibers into a strand. Tests indicate that the number of packages which may be completed without interruption due to breaks in the fiber can be more than doubled by adoption of the present invention. In addition to an increase in continuity of operation, lower tension in the fibers results in less breakage of fibers as the strand is wound directly on the package and consequently less fuzz is experienced in the finished package. The package is made more handleable thereby, but is also made more handleable because of less internal stress in the package due to the lower tension of the strand as it is wound in the package, thus facilitating a more free runout of the strand during unwinding for subsequent operations such as further processing in textile machines.

Another and still further object of the present invention is to make possible the fiberization of glass compositions heretofore impossible to fiberize. In many instances the properties of the glass are such that the glass has a high liquidus temperature or a steep slope in its viscosity-temperature characteristic above the liquidus temperature which has made it very difficult or impossible to fiberize because of the critical relationships which must be maintained in the main body of glass to establish fiberization viscosity conditions. By the use of cone shields, acccording to the present invention, however, such fiberization is made possible by environmental control of the forming zone. Control in this way permits a rapid lowering of the viscosity of highly fluid glass emitted from the orifices to the viscosity range within which fibers may be formed and effects cone stabilization to the extent assuring formation of fibers of uniform high quality.

A feature of the invention lies in the increased job efficiency possible by use of cone shields which results because each operator may be assigned to operate more than the usual number of feeder positions.

Another feature lies in the fact that by operating the melting unit at a higher temperature, the viscosity of the glass in the melting unit is less critical to temperature changes since the viscosity-temperature curves generally level off at a higher value, whereas much of the glass used to produce the fibers was previously required to be maintained at a temperature in a range where the curve was more sharply inclined and where operating characteristics were more susceptible to modification with slight changes in temperature.

Other objects and features which I believe to be characteristic of my invention are set forth with particularity in the appended claims. My invention, however, both in organization and manner of construction together with further objects and advantages thereof may be best understood by reference to the following description taken in connection with the accompanying drawings, in which:

Figure 1:
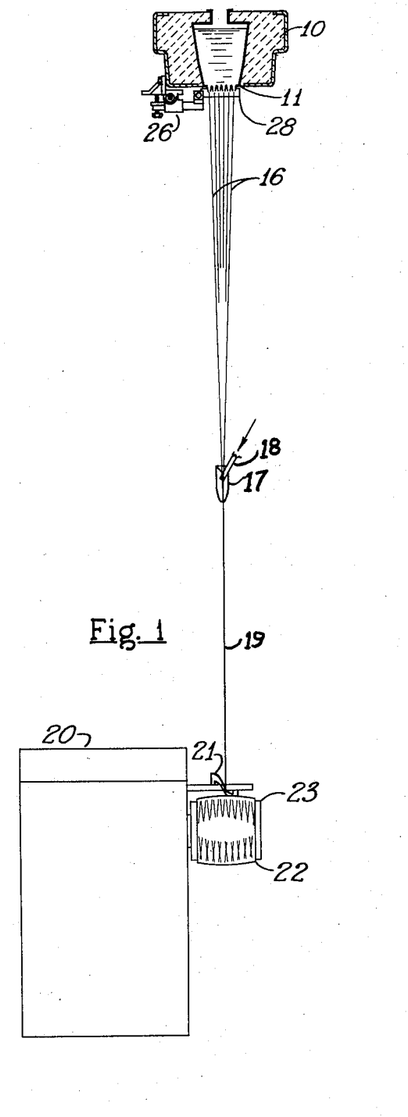
Figure 1 is a side-elevation view of a general layout of apparatus including shielding components for production of continuous glass fibers in accordance with the present invention.
Figure 2:
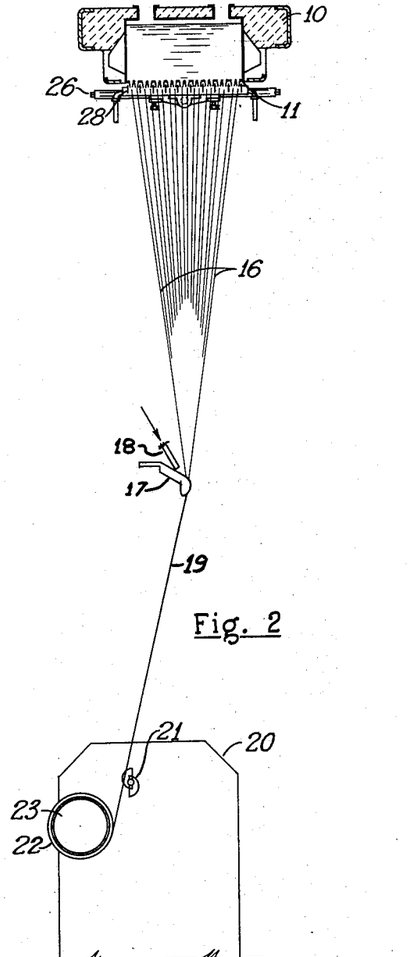
Figure 2 is a front-elevational view of the apparatus of Figure 1.

Referring now more particularly to the drawings, Figures 1 and 2 illustrates a refractory furnace 10 for reducing a body of glass to a molten condition having a bushing or feeder 11 associated therewith from which a plurality of streams of glass are emitted from orifices in the feeder tips for attenuation into fibers 16. The fibers are drawn to a gathering member 17 at which they are gathered and at which sizing fluid is also applied to the fibers as it is supplied from a tube 18 connected to a reservoir not shown. The strand 19 formed of the gathered fibers is packaged by a winder 20 which collects the strand on a tube 22 mounted on a rotating collet 23 and traversed by a suitable traversing device such as a spiral wire traverse 21. The winder provides the force of attenuation for the fibers by reason of rotation of the collet which develops tension in each fiber to withdraw it from the molten glass flowing from the feeder.

A cone shielding unit 26 provides a plurality of metal shield members in the form of blade-like fins 28 each extending across the width of the feeder between a pair of rows of feeder tips 14, while each adjacent pair of such members has two rows of tips aligned therebetween. The orientation of the thin blade-like fins 28 across the under part of the feeder with feeder tips aligned therebetween may be seen more clearly in Figures 3, 4 and 5 which illustrate that the tips 14 and the cones 12 emitted therefrom are, in effect, divided into crosswise pairs of rows. The fins 28 extend from a longitudinal hollow cooled manifold or header bar 29 disposed laterally with respect to the feeder structure. Cool water or other coolant is supplied and removed from the header by suitable means such as hoses or conduits 27. Water is fed to one end of the header bar and flows through a hollow channel 25 passing longitudinally through the bar and is emitted from the opposite outlet end at a somewhat higher temperature since upon passage through the header, heat is absorbed from the fins. The water can be passed through the channel 25 at a controlled rate of flow and at temperatures predetermined to establish desired temperature differentials between the fins and the glass emitted from the feeder tips.

This invention permits feeders such as feeder 11 to have a larger number of rows of tips which lends to more efficient utilization of operating space as well as efficiency in use and fabrication of the precious metals of which such feeder structures are usually made. In the past, however, operating experience without the use of cone shields has indicated that although feeders with one or two lengthwise rows of tips operated satisfactorily, feeders with three or more rows of tips could not be operated without some difficulty and more than four were practically impossible to operate satisfactorily. This situation arises apparently because the inner rows of tips and cones cannot dissipate heat as readily while the outer rows of tips and cones having access to cooler surroundings can more readily dissipate heat to effect satisfactory operation. The glass emitted from the inner rows of tips thus was more fluid and tended to flood over the feeder surface and break in continuity of flow because of less cohesiveness in the glass of lower viscosity. It will be recognized that heat dissipation from the inner rows is not readily absorbed by surrounding structural parts of the feeder because of a relative lack of temperature differential. By arranging for placement of at least one shield member directly adjacent to each cone emitted from a feeder, however, the feeder can be operated satisfactorily regardless of the existence of interior longitudinal rows of tips such as when more than two rows of tips are provided in a feeder.

Figures 5, 6, 7:
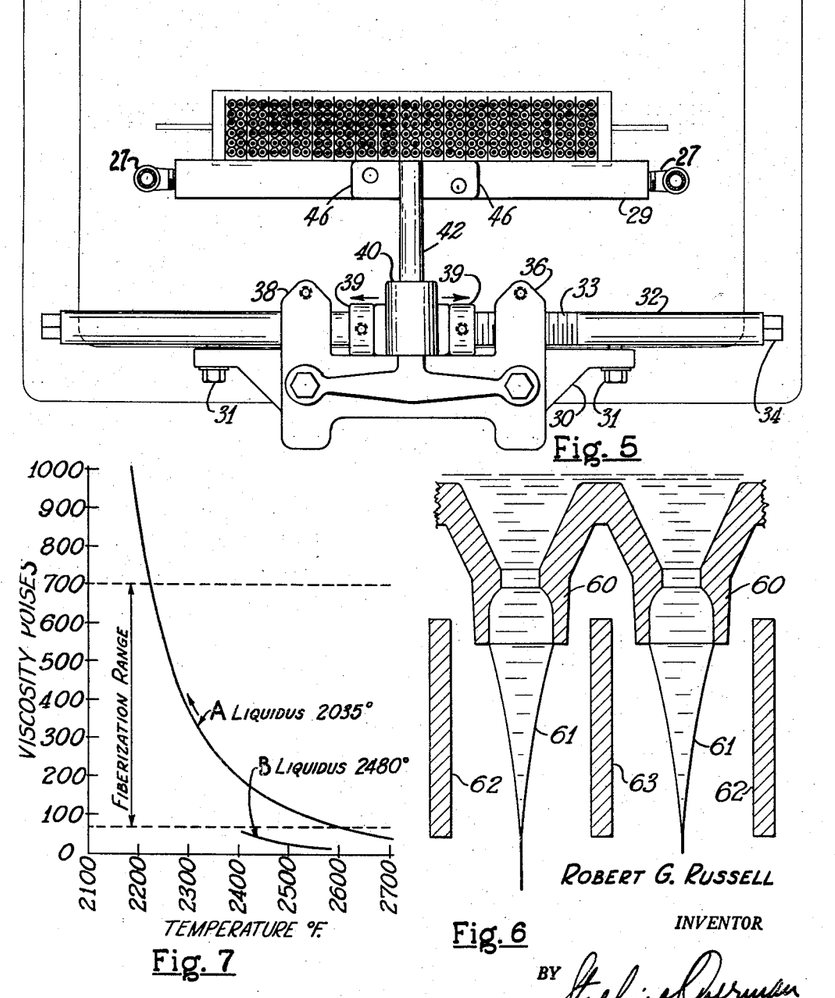
Figure 5 is a bottom plan view in part of the apparatus of Figure 3 showing the general layout of the feeder section.
Figure 6 is an enlarged cross-sectional view of a pair of feeder tips with cone shields on both sides of each tip.
Figure 7 illustrates representative curves of the viscosity-temperature characteristic of two glasses which may be fiberized according to the present invention.

Accordingly, where the feeder has more than two rows of tips, such as the six rows of the illustrated embodiment, the shields may be conveniently extended crosswise under the feeder and spaced apart with two rows of tips between each adjacent pair of shields as shown in Figure 5. Fins having a thickness in the order of .02" to .06" have been found to perform satisfactorily as shields. The orifices from which the cones of glass being attenuated emerge may be in the order of .02" to .08" in diameter with a diameter of .04" being a representative size for many form-forming operations. The space between the crosswise rows of tips within which the fins pass may be made slightly wider than the remaining crosswise rows to more readily accommodate their thickness dimension and also provide greater tolerance for lateral positioning of the shields.

The height of the fins 28 is preferred to be such that when in operating position, the upper edge of each is at a level slightly above the bottom of the tips with which it is associated while its bottom edge extends downwardly to the level of the apex of the cones emitted from the tip orifices for reasons to be explained hereafter. By way of example, the upper edge of the fins may be about 1/32 of an inch above the bottom edges of the tips of the feeders, but not in contact with the under surface of the feeder. With such positioning of the upper edge of the fins, their height to provide full length shielding of the cones in some instances need only be in the order of 3/8 of an inch.

To facilitate installation of the shielding unit in proper association with the feeder, a mounting means with suitable position adjustments is provided. As shown with greater clarity in Figures 3, 4 and 5, the mounting means includes a mounting bracket 30 designed for securement to the side of a jacket 15 of the glass-containing unit 10. The bracket 30 is secured to the side of a jacket by a suitable fastening screw 31 and is more rigidly fixed in position by a second right-angularly related set screw 35 screwed into abutting relationship with the bottom of the jacket. A rotatable support shaft 32 is held in longitudinal parallel relationship with the feeder 11 by a pair of spaced bearing collars 36 and 38, Figure 5, fixedly associated with the mounting bracket. The support shaft has a threaded portion 33 arranged for engagement with a corresponding internally threaded section in the collar 36 to permit longitudinal axial positioning of the shaft. A squared end 34 of the shaft 32 permits fitting of a crank handle thereto for axial adjustment.

Figure 3:
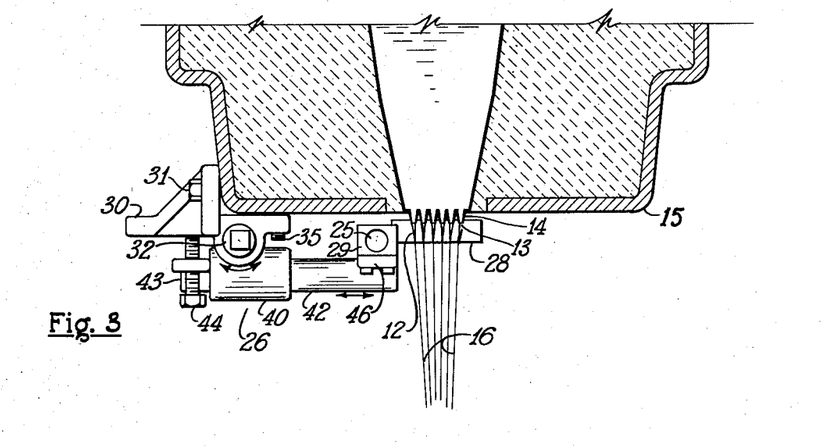
Figure 3 is an enlarged side-elevation view of the fiber-forming portion of the apparatus of Figures 1 and 2.
Figure 4:
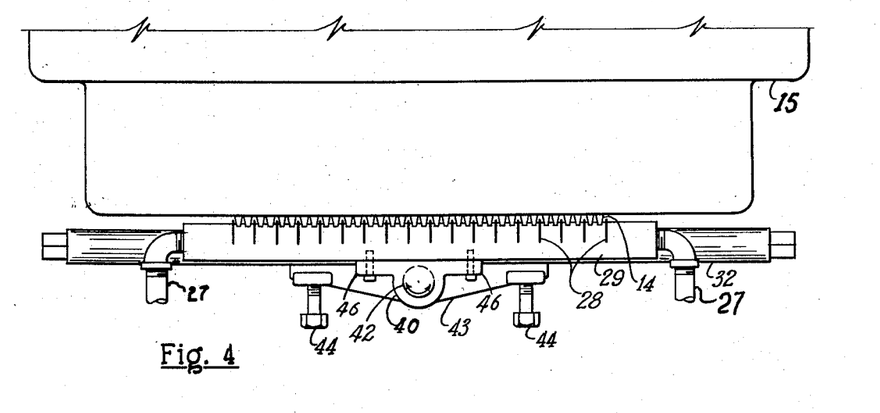
Figure 4 is a partial front-elevation view of the apparatus of Figure 3.

The header 29 of the shield unit is mounted on a table surface 46 provided on a tilting bracket 42 which in turn is adjustably associated with a pivot bracket 40 mounted on the shaft 32 between the collars 36 and 38. The pivot bracket 40 is positioned along the length of the shaft 32 by a pair of set collars 39 each of which is fixedly associated with the shaft by a set screw. The pivot bracket permits the raising and lowering of the fins 28 about the shaft 32 as a pivot by adjustment of the screws 44 extending in right angular relation through a pair of arms 43 to the underside of the mounting bracket on the side of the shaft 32 opposite to that on which the fins 28 are located.

By this arrangement it will be seen that the fins may be positioned lengthwise and crosswise with respect to the bushing tips and may be adjusted in horizontal level relationship both across the width and length of the feeder as well. Lateral positioning of the fins across the width of the feeder is provided by cross movement of the tilt bar in the pivot bracket. Lateral movement of the fins in a lengthwise direction of the feeder is effected by movement of the pivot bracket 40 along the length of the support shaft 32 by way of rotation of the shaft. Horizontal leveling of the fins across the width of the bushing is effected by adjustment of the screws 44 to raise and lower the fins about the support shaft 32 as a pivot. Pivoting of the fins about the shaft 32 is here, in effect, an adjustment in a vertical direction because of the long distance from the shaft to the fins compared to the adjustments made. Horizontal leveling of the series of fins as a group across the length of the feeder is effected by compensating adjustment of the screws 44 to rotationally tilt the bracket 42 within the pivot bracket 40. The shielding arrangement described above has an operating advantage in that the operator can readily view the cones of glass emitted from the feeder orifices without obstruction since the fin-like shields extend crosswise of the bushing from the header and are open on the side opposite the bushing from that on which the header is located to permit ready observation of all the cones in each of the crosswise rows. This permits the operator to assure that all fibers to be included in the strand are being withdrawn from the feeder and gathered into the strand when starting up an operating position.

Figure 6 is an enlarged view of two feeder tips of a pair of adjacent rows of tips 60 illustrating the physical relationship of cone shields thereto on opposite sides of cones of glass 61 emitted from the tips. Although it has been found that cone shields operate satisfactorily when the rows of tips are divided into pairs of rows such as by cone shields 62, it will be readily understood that corresponding effects can also be obtained by dividing the tips and cones into single rows with an intermediate shield 63 between the tips to provide shield members disposed immediately adjacent both sides of each tip as illustrated by Figure 6.

In operation the cone shields stabilize the cones from which the glass fibers are attenuated in a dual sense, namely, (1) by controlling absorption of heat from the glass on emission from the feeder tip and thereby to impart a viscosity to the glass which promotes stability thereto in its fiberization range, and (2) by reducing the disrupting erratic effects of air eddies about the cone as may be caused by both thermal differential conditions and motions of the glass.

The exact mechanics by which the glass is withdrawn at high speed from a feeder tip is exceedingly difficult to analyze from a theoretical standpoint, because the cone of hot glass is in a region of high temperature gradients and accordingly, a region where conditions are such that rapid variation of viscosity can readily occur. Thermocouple tests in the region of unshielded cones have indicated almost continuous temperature variation in the order of 300° and 400° F. within extremely short time intervals. Observations also indicate that heat losses from the cone are effected by way of radiation as well as by convection. It is believed that most of the radiation losses occur in the region immediately below the feeder tip, in other words, the base of the cone, where the glass has its brightest glow and that as it moves down toward the apex of the cone, more and more losses occur by convection. Accordingly, when cooled cone shields are placed adjacent the cones, heat transfer thereto is by way of radiation as well as convection. Thus, the material of the shield is chosen for its thermal conductivity and emissivity to promote efficient absorption and dissipation of the heat given off by the cones. Examples of metals among those which can perform satisfactorily in this respect are copper, platinum, silver, aluminum, Monel, and nickel as well as alloys of such metals. In this respect it is desirable to have the infrared radiations absorbed and not simply reflected by the material, which makes high emissivity of the material an important factor in its selection. Added to this, the thermal conductivity of the material determines the rate at which the heat may be transferred to the water-cooled header.

Aside from their function in absorbing heat from the glass, the cone shields also separate or isolate the cones for environmental control and prevent broad sweeping gusts of air from freely flowing about the region of the cones. Thus, erratic variations in temperature caused by such gusts or drafts are restrained, while, in addition, the eddies created by sweeping of the air past the cones are practically eliminated. Furthermore, the cumulative flow of air which may be caused by the temperature differential between forming cones is reduced by separation of the rows of cones from each other, thus also minimizing the complexity offered by their thermal interaction. Further, in this regard, the height of the shields is preferably such that they extend down to the virtual limits of the cone. It is preferred that the height of the shields be such that they extend from a slight distance above the bottom of the tips from which the cones are emitted downwardly alongside of the cones to a level coinciding with the tip of the effective length of the cone. The term cone as herein used designates the shape assumed by a stream of molten glass in the zone in immediate proximity to the outlet of an orifice from which it emerges and is attenuated. In a mathematical sense the shape assumed might be more accurately termed a tractrix. The effective length of the cone as used is defined as that length of the emerging glass susceptible to controlled heat loss or the length of the stream in which heat loss from the material substantially affects the final diameter of the filament. Test observations have revealed that this length corresponds practically to the visual length of the cone terminating with a virtual apex. It is in this portion that the glass flows most freely, while the glass beyond the virtual apex of the cone where the final fiber diameter is closely approached is less susceptible to instability and to being affected by shielding.

If the shields are extended too high above the level of the bottom of the tips, they proximate joinder with the bottom of the feeder and thereby act undesirably as radiating fins for heat of the feeder. Furthermore, the top of the shield should be above the level of bottom of the tips otherwise the highest temperature portion of the cones would go unshielded. Radiation absorption would thus be reduced and drafts of air would have free access to the critical fluid cone bases to cause considerable reduction in efficiency.

The cone shields must also be sufficiently long to prevent drafts from having direct access to the portions of the cones near the apex, but not so long as to cause the extreme speed of the fiber surfaces which would otherwise exist within the boundaries at the bottom of the shields to promote a pumping of the cone. The latter appears to occur partly by reason of air being drawn into the shield boundaries from the above due to the frictional relationship between the high speed of surrounded fiber portions and partly because with long shields surrounding such high velocity surfaces, air is rapidly withdrawn from the surrounded space at the bottom of the shields to cause the combination to function in aspirator-like fashion. In still another sense, the shields in determining the establishment of air-flow conditions may be looked upon as baffle or damper members.

As an example of conditions of operation when cone shields are utilized, a conventional feeder producing 450 strand—45,000 yards per pound of glass—operated satisfactorily at a flow rate of approximately ⅓ to ½ gallon of water per minute through the header at an input temperature of 70° to 75° F. The water emitted from the outlet under these conditions was at a temperature of 85° to 90° F. The average number of complete packages which could be wound per hour was more than doubled in comparison to the standard operation without cone shields. In addition, the number of breaks at the feeder was cut to 1/10 the number originally experienced while the number of breaks at the gathering point was cut by more than ½. The power input to the feeder under these conditions was increased approximately 15% over standard. From the latter figure it will be recognized that the feeder was maintained at a higher temperature than standard for feeders without cone shields and that the cone shields acted to absorb the additional heat from the cones themselves to effect control of the cone temperature and its viscosity in the fiberization range.

In fiberizing glass three characteristics of the glass should be considered because of their importance in determining operating conditions. One such factor is the slope of the curve of the viscosity-temperature characteristic of the glass in the fiberization range and above. If the slope of this curve is relatively steep, the temperature range for forming fibers is critically narrowed and difficult to establish within the short time interval within which each portion of fiber is formed. By the use of cone shields, however, this temperature range may be more definitely imparted to the glass in the forming zone since the portion of the path within which the temperature change occurs is controllably influenced by the shields.

A second factor which must be considered in effecting fiberization of glass is the liquidus temperature of the glass. If the liquidus temperature is high, then the glass must be raised in temperature to a point where its viscosity is critically near the border line or outside of the viscosity range within which fiberization can be effected. Under such conditions the cone shields can be used to cool the glass to a fiberizable viscosity on emission from the tips even though the temperature and fluidity of the glass in the main body is much beyond the fiberization range. Without cone shields, the glass on emission from the tips does not cool at a sufficient rate to permit establishment of a continuous pull from the low viscosity fluid. In other words, the surface tension of the highly fluid glass would cause a beading at the tips and possibly flood the feeder and thereby prevent continuous attenuation into a fiber.

A third important characteristic in considering fiberization of a glass is the rate of devitrification of the glass. If the rate of devitrification is high and the molten glass is cooled too slowly, the glass passes through its temperature of devitrification slowly, and may undesirably freeze in a crystalline phase. By use of cone shields, however, glasses having high rates of devitrification may be chilled more rapidly on emission from the feeder tips and can be solidified before even partial devitrification can occur.

Because by use of the present invention it is possible to raise the temperature of the main body or source of the glass and consequently lower its viscosity, glasses having a viscosity-temperature characteristic like that represented by curve A of Figure 7 may be made less critical to temperature variations of the feeder. The composition of the glass illustrated is as follows:

| | Percent |
|---|---|
| $SiO_2$ | 54.2 |
| $Al_2O_3$ | 14.6 |
| $CaO$ | 17.3 |
| $MgO$ | 4.6 |
| $B_2O_3$ | 8.4 |
| $Na_2O$ | 0.6 |
| $Fe_2O_3$ | 0.2 |
| $F_2$ | 0.3 |

As may be seen, curve A changes from a steep viscosity-temperature characteristic to a gradually sloping characteristic at higher temperatures within the fiberization.

range. Thus, when the glass is maintained at the higher temperatures, its viscosity is less critical to temperature variations such as may be experienced by extraneous electrical current variations through the feeder.

Besides reducing the critical relationship between viscosity and temperature within the main body of the glass, high temperatures also reduce tendencies toward devitrification of the molten glass which are frequently experienced when the main body is at lower temperatures. Greater homogenization and more uniform structural constitution of the glass on emission of the glass from the feeder tips is promoted by higher temperatures. When a glass such as that represented by curve B of Figure 7 has a high liquidus temperature, i.e., 2480° F., the viscosity of the glass when raised to such temperature may be so low as to be outside the fiberization range. The composition of this glass is as follows:

| | Percent |
|---|---|
| CaO | 29.2 |
| MgO | 3.9 |
| BaO | 5.0 |
| $Na_2O$ | 3.4 |
| $K_2O$ | 2.7 |
| $Al_2O_3$ | 44.8 |
| $SiO_2$ | 10.3 |
| $B_2O_3$ | 0.7 |

Production of continuous fiber from such glass by prior art means is practically impossible because the glass on emission from the feeder would have insufficient cohesiveness to resist its surface tension for establishment of the continuity required to form such a fiber. By means of the present invention, however, the glass may be heated to a fluid stage outside of the fiberization range and still be fiberized by reason of the more rapid cooling of the glass which can be effected by shields to cause the liquid to pass to its viscous fiberization condition more rapidly on emission from the tips. By permitting heating of the glass to be fiberized to a higher temperature according to the present invention, fiberization can also be effected with less attenuating force and correspondingly with less tension being developed in the fibers between the feeder and the collection zone. Because the total tension in the fibers is lower, the tension in the package being wound is also lower, thereby resulting in less breakage of fibers in the package and consequently less fuzz. The lesser tension in the finished package also results in a more free runout of the strand during unwinding of the package for subsequent use such as in automatic textile processing machines where free runout is often an economic necessity.

Still another factor associated with tension in the fibers is the shortened feeder which is made possible by reason of multiple rows of tips permitted by use of cone shields. With a shorter feeder 70 instead of the standard feeder 71 illustrated in dotted lines in Figure 8, the length of the fan of fibers between the feeder and the gathering point may be greatly reduced without modifying the angular relationship of the outer fibers in the fan with respect to the vertical. It is well established that fibers at the extremities of the fan of fibers emitted from a feeder are subjected to the greatest tension, and that an angular relationship of about 7° with respect to the vertical is an average maximum limit which may be resorted to without presenting an operating condition in which excessive breaks will occur because of excessive tension. In the present invention the feeder is reduced in length for a given number of orifices because of the increase in the number of rows of orifices which may now be provided across its width. The length of the bushing and consequently the width of the fan of fibers at the point of emission is correspondingly reduced. Thus, for the same maximum angular relationship of the extreme fibers with respect to the vertical, the fan of fibres 74 emitted from a standard length feeder 70, may be reduced to a smaller fan 72 shortened proportionately to the reduction in length of the feeder.

A shortened fan of fibres is of importance in that less total air is entrained by its fibers, thereby desirably reducing the total tension established in the individual fibers and strand. Continuity of the forming operation and reduction in breakage of individual fibers at the collection package are thus promoted. Furthermore, the shortened fan is of importance in reducing the amount of vertical space required for a given standard-forming operation. The complete operation can be placed within a space which an operator can readily maintain under control with less expenditure of effort.

In operating a given forming position having a feeder with 204 holes arranged in two rows of tips, a height of 30″ was required to gather the 204 fibers from the feeder in order to prevent establishment of excessive tension in the outer fibers. When the same number of fibers was attenuated from a six row feeder having an associated cone shielding structure, the required length of the fan of fibers was no more than 14″ with the same angular relationship in the fibers at the extremities.

Figures 8, 9:
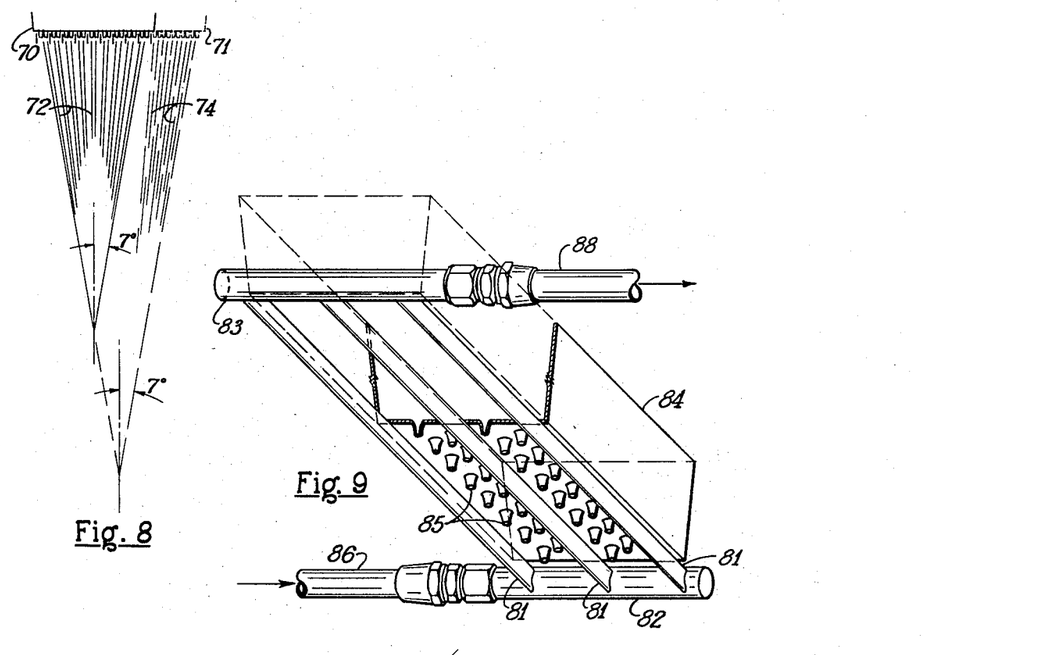
Figure 8 is a composite front-elevation view of fibers attenuated from a bushing according to the present invention and in comparative dotted lines the space consuming wider and longer fan of fibers which results when shielding according to the present invention is not utilized.
Figure 9 illustrates another cone-shielding arrangement adapted to operation in accordance with the principles of the present invention.

Figure 9 illustrates another type of cone-shield unit 80 in which hollow water-cooled tube members 81 extend lengthwise under the feeder 84 between an inlet header 82 and an outlet header 83 to divide the longitudinal rows of tips 85 into pairs of rows. The tubes 81 are made of material such as copper and are flattened into a cross-sectional shape having a longer axis dimension extending parallel to the axis of the cones with which they are associated. The flattened tubes extend from a level slightly above the bottom of the tips down to a level corresponding to that to which the effective length of the cone extends. The tips of the feeder of this arrangement may be staggered, if desired, and two shield members 81 passed parallel to the outside rows of such tips while a central shield member 81 passed between the central rows of tips divides the tips into pairs of shielded rows. Water or other coolant is supplied to the inlet header 82 and removed from the outlet header 83 by way of inlet and outlet hoses 86 and 88, respectively.

Figure 10:
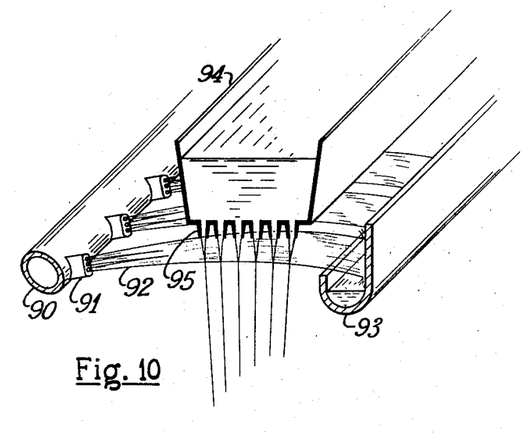
Figure 10 is a perspective view of still another cone-shielding arrangement adapted to operation in accordance with the present invention.

Figure 10 illustrates still another embodiment of the present invention in which shielding between crosswise rows of tips is provided for a feeder 94 by a series of narrow streams of water 92 ejected from water nozzles 91 associated with a common header 90. The streams are divided into groups of three, each group being emitted from a common nozzle 91. The nozzles 91, 91 each have three orifices from which a group of streams are emitted which merge on emission to form a ribbon-like flow of water. The ribbons of water pass between the crosswise rows of tips 95 to isolate the rows in a manner similar to the fin and the tube structures of the first two embodiments of the invention. The water is then collected in a collecting trough 93 on the opposite side of the feeder from that on which the nozzles 91 are located. The ribbons of water flowing across the rows of tips of the feeder act like solid shield members in that they prevent the flow of sweeping drafts of air across the feeder tips and cool the forming cones.

Figure 11:
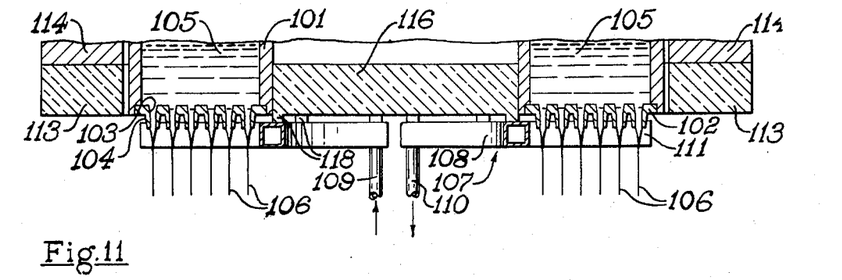
Figure 11 is an elevational view in cross section of an annular feeder and associated shield unit illustrating another arrangement of the invention.
Figure 12:
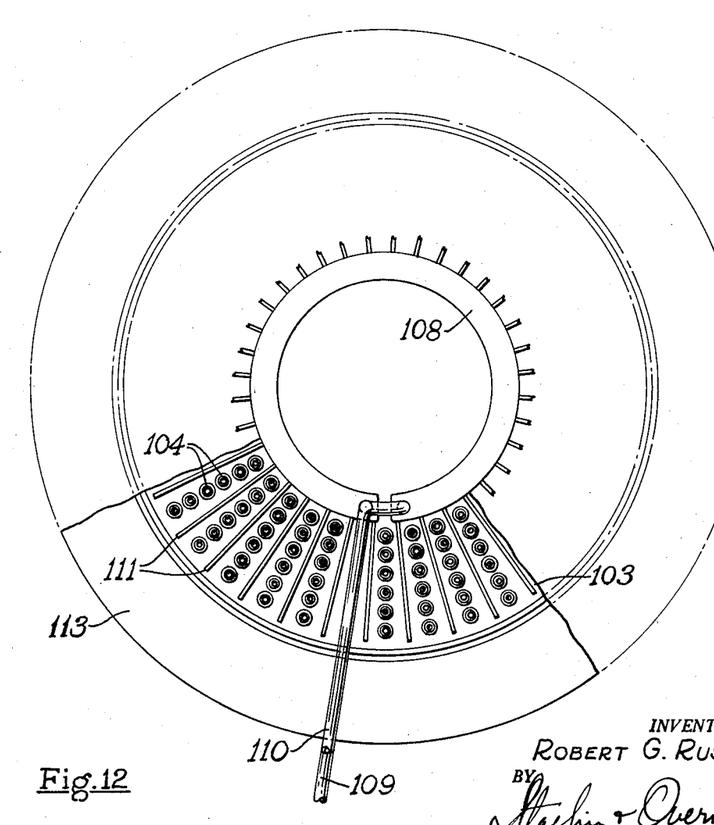
Figure 12 is a bottom plan view of the feeder and shield unit of Figure 11.

Figures 11 and 12 illustrate another arrangement by which fin-type shield members can be utilized with a circular feeder. In this instance the feeder 102 is an annular feeder having fin members extending radially from an associated annular manifold or header. More specifically, Figure 11 illustrates in cross section such a feeder associated with a container for molten glass shown in part having an outer cylindrical wall 100 and an inner cylindrical wall 101 between which the horizontal orifice plate or feeder 102 is provided in the form of an annular ring. The feeder contains a plurality of orifices 103 in projecting tips 104 through which the molten material 105 positioned upon the feeder flows. The container for the molten glass is enclosed within a heat-insulating wall provided by the annular wall members 113 and 114, the latter of which is shown in part. A disc 116 of heat-insulating material is positioned within the inner wall 101 of the unit and is disposed generally above the header 108 for the shield unit 107.

The unit 107 in general comprises the annular header 108 which is hollow to permit passage of coolant therethrough supplied through an inlet conduit 109 and removed by way of an outlet conduit 110. Fins 111 comprising thin blade-like members extend radially outwardly from the header and across the underside of the feeder portions with which they are associated between the radially aligned rows of tips 104. The entire shield unit is supported in spaced relation from the disc 116 by way of refractory projections 118 or other suitable fastening means, with the fins 111 extending between the tips 104 but spaced from contact with the undersurface of the feeder.

Figure 12 shows the radially aligned orientation of orificed tips 104 on the underside of the feeder 102. The radial rows of tips also form part of six circumferentially aligned rows, but the fin shield members 111 extending from the header 108 divide the circumferential rows into groups each comprising one or two radially oriented rows of tips. The tips 104 are also arranged so as to provide a gap in the regular spacing between the glass streams 106 emitted therefrom to permit passage of the inlet and outlet conduits 109 and 110, respectively, to the exterior of the cylinder generally defined by the spaced streams.

It will be recognized that the header 108 may be divided into two or more separate headers each having their own inlet and outlet conduits if desired. The fins 111 can also be provided with an outer annular header in addition to the inner header 108 and arranged so that each acts to cool fins extending between them. It is preferred, however, that the fins be arranged in generally radial relation to facilitate visual inspection of the tips and glass emitted from the orifices thereof during operation of the fiber-forming unit. With concentric inner and outer annular headers, the shield members may be tubular and one of the headers arranged to supply coolant to be passed therethrough while the other acts as an outlet header for the coolant. In still another arrangement the feeder may be a solid circular plate with orificed tips extending in spaced relation completely across the underside thereof with an outer annular header having radially inwardly extending shield members.

By partial representation Figure 12 shows 204 tips grouped into radially aligned groups, each comprising a row of six aligned tips, isolated by the fins 111 to provide independent environmental control for each group. Under certain circumstances it may be desired to align the tips for circumferential shield members between rows or a spiralling relation of shields as well as other non-radial orientation of such shields. It will also be understood that the fins can be arranged to divide the tips into groups each having two rows of aligned tips instead of single rows as illustrated.

As in the previous embodiments of this invention, it is preferred that the shield members be passed between the rows of tips in such a manner as to protect the zone extending at least from the immediate level of the orifices to a level somewhat lower where the glass flowing into the filaments is substantially unaffected by variances in heat loss or disturbances from extraneous atmospheric drafts.

It will be understood that the shields as disclosed herein have value in the production of fibrous glass combinations other than strand products. For example, the shields may be used in the formation of glass primaries such as described in Patent 2,489,243 in which the glass is attenuated at slow speeds such as by mated rollers between which they are drawn, and then disrupted into discontinuous fibers such as by the blast of a gaseous burner flame. By reason of the use of shields, the primaries may be imparted a more uniform diameter from end to end along their individual lengths and may be made more consistently alike in diameter between each other. When such primaries are placed in alignment next to each other for passage through the burner blast or flame, the uniformity of diameters permits establishment of more uniform conditions of disruption for all primaries. The flame of the burner under such conditions then may be more critically adjusted for optimum heating and disruption conditions for the specific diameter of fibers used. Besides thus effecting a more efficient operation for disruption of the glass into discontinuous fibers, the resulting secondary fibers are correspondingly more uniform in properties.

Correspondingly it will be understood that shielding as herein disclosed can be advantageously used in the production of staple-type fibers in which attenuation is accomplished by gaseous blasts such as steam or air. In this respect shields may be incorporated in processes such as that decribed in Patent 2,314,857.

It will be apparent to those skilled in the art that other modifications of the present invention are possible without deviation from the concepts thereof. For instance, the surfaces of the solid shields of the first and second embodiments may be modified by a roughening to promote greater absorption of heat, or they may be coated with material such as graphite to prevent buildup of extraneous materials or they may be coated with materials which change the radiation absorption characteristics to provide the optimum cone environment for different glass compositions and arrangements of feeder tips. Additionally, the embodiment of Figures 1 to 5 may be provided with a header on both ends of the fins to permit them to be made longer while still effecting uniform cooling across the complete length of the fins. Shields may also be arranged to be located only adjacent rows of cones other than outside rows which may otherwise have access to radiation absorption surroundings.

Thus, while I have shown certain particular embodiments of my invention, it will, of course, be understood that I do not wish to be limited thereto, since many modifications may be made, and I contemplate by the appended claims to cover all such modifications as fall within the true spirit and scope of my invention.

I claim:

1. Apparatus for producing glass filaments comprising a feeder for feeding molten glass having projecting tips extending from an under surface thereof, said tips being aligned in rows and each having an orifice provided therein from which a stream of glass is emitted, means for attenuating the streams to fine filaments, said attenuating means acting on said streams in such a way as to impart in general a conical shape to each extending from a base at its respective orifice to an apex from which its respective filament is withdrawn, environmental control means associated with said feeder but out of contact therewith comprising thin longitudinal fin members arranged in side-by-side parallel relationship and aligned so that each extends in spaced relation from said feeder between a pair of rows of cones emerging from said tips with a maximum of two rows of cones residing between each pair of such members, and fluid-cooling means comprising a fluid-cooled header to which each of said fins is affixed for support and conductive removal of heat from said fins to effect a desired degree of cooling thereof.

2. Apparatus for producing glass filaments comprising a feeder for feeding molten glass having projecting tips extending from an under surface thereof, said tips being aligned in rows and each having an orifice provided therein from which a stream of glass is emitted, means for attenuating the streams to fine filaments, said attenuating means acting on said streams in such a way as to impart in general a conical shape to each extending from a base at its respective orifice to an apex from which its respective filament is withdrawn, environmental control means associated with said feeder but spaced out of contact therewith comprising thin longitudinal fin members arranged in side-by-side parallel relationship spaced below said feeder and aligned so that each extends generally from one side lateral of the feeder to a position between a pair of rows of cones emerging from said tips, said fin members being arranged so that a maximum of two rows of cones reside between each pair of such members, each such fin member also extending generally parallel to the axes of the cones with which it is associated at least from the level of the base of the cones to the general level of the apices of the cones, and fluid cooling means comprising a fluid cooled header associated directly with said members to absorb heat therefrom conductively to effect a desired degree of cooling thereof.

3. In apparatus for producing glass filaments comprising a container for molten glass and having orifices in one wall from which streams of glass are drawn thereby forming an attenuating zone outwardly of the container, means for continuously attenuating the streams to fine filaments and winding the filaments on a spool, a series of longitudinal fin-like members arranged in parallel relationship adjacent the orifice-containing wall but out of contact therewith, said members being aligned with the orifices forming the sources of said streams in such a manner that they are disposed substantially in the attenuating zone with the streams emitted from the orifices arranged to pass closely adjacent said members, the general dimension of said members extending in the direction of movement of said streams being of magnitude such that it extends at least from the general level of said orifices to the general level corresponding to the limit of said attenuating zone, and means comprising a fluid cooled header to which each of said fin members is affixed for support and conductive cooling of the fin members to rapidly and uniformly reduce the temperature of the streams in the attenuating zone by proximity of the streams to said members.

4. In apparatus for producing filaments of heat-softenable material comprising a feeder for feeding such material in molten form having orifices from which streams of such material flow, means for continuously attenuating the streams to fine filaments in an attenuation zone immediately adjacent said feeder, said feeder orifices being arranged in a pattern made up of rows of said orifices, a fluid cooled member disposed to one side of said rows of orifices out of contact with said feeder, a series of thin longitudinal heat-resistant shield members of high thermal conductivity fixed in heat-conducting relationship with said cooled member and extending therefrom in aligned side-by-side relationship in said attenuation zone to subdivide the total number of streams emitted from said orifices into smaller groups within said zone, said shield members also being aligned so that each of the streams emitted from said rows of orifices has at least one of said members extending in adjacent heat-absorbing relationship therewith, the ends of said shields opposite to those fixed to said cooled member being free of contact with surrounding structure and being spaced from each other.

5. The apparatus of claim 4 wherein the feeder is generally circular in shape with orifices aligned in radial rows and said shield members are radially oriented in their subdivision of the total number of streams into smaller groups.

6. The apparatus of claim 4 wherein the feeder is annular in shape with said fluid-cooled member being centrally disposed with respect to the feeder and the shield members extending therefrom extend generally radially outward.

7. In apparatus for producing filaments of heat-softenable material comprising a container of such material in molten form having orifices in a wall from which streams of glass are drawn thereby establishing an attenuation zone externally of the source, means for continuously attenuating the streams to fine filaments, said orifices being arranged in rows in a generally rectangular pattern, a series of thin longitudinal fin members of material having a high thermal conductivity extending in generally parallel relationship to each other adjacent the orificed wall but spaced out of contact therewith, said members being aligned with the orifices such that the members reside generally in the attenuation zone to subdivide the total number of streams into smaller groups with a maximum of two rows of such streams between each pair of said shield members, a support structure for said shield members disposed laterally to one side of said orifices and to which said shield members are directly affixed in conductive heat-transfer relationship, and means for cooling said support structure to effect removal of heat from said shield members.

8. In apparatus for producing filaments of heat-softenable material comprising a container of such material in molten form having orifices in a wall from which streams of glass are drawn thereby establishing an attenuation zone externally of the source, means for continuously attenuating the streams to fine filaments, said orifices being arranged in rows arranged in an annular pattern and extending generally radially outwardly from a given point, a series of thin longitudinal shield members of material having a high thermal conductivity arranged in generally radially oriented relationship from said given point parallel to and spaced from the orificed wall, said shield members being aligned with the orifices such that the members reside generally in the attenuation zone to subdivide the total number of streams into smaller groups with a maximum of two rows of such streams between each pair of said shield members, a generally circular cooled support structure for said shield members disposed in the central portion of said annular pattern of rows of orifices, said shield members being fixed to said support structure in heat-conducting relationship, and controllable cooling means for maintaining said support structure cooled continuously to withdraw heat from said shield members.

References Cited in the file of this patent

UNITED STATES PATENTS

| | | |
|---|---|---|
| 2,489,508 | Stalego | Nov. 29, 1949 |
| 2,634,553 | Russell | Apr. 14, 1953 |
| 2,775,850 | Stalego | Jan. 1, 1957 |